United States Patent [19]
Griffin et al.

[11] Patent Number: 5,767,674
[45] Date of Patent: Jun. 16, 1998

[54] APPARATUS FOR PROTECTING A MAGNETIC RESONANCE ANTENNA

[76] Inventors: Douglas D. Griffin, 28 Sunset Hill Rd., Bethel, Conn. 06801; James Stephen Hall, 9914 Sagegate, Houston, Tex. 77089; Abdurrahman Sezginer, 160 Pound Ridge Rd., Bedford, N.Y. 10506

[21] Appl. No.: 639,009

[22] Filed: Apr. 17, 1996

[51] Int. Cl.$^6$ .................................................. G01V 3/00
[52] U.S. Cl. .......................................... 324/303; 324/356
[58] Field of Search ................................. 324/303, 300, 324/314, 306, 356, 369

[56] References Cited

U.S. PATENT DOCUMENTS

| | | | |
|---|---|---|---|
| 4,536,714 | 8/1985 | Clark | 324/338 |
| 4,949,045 | 8/1990 | Clark et al. | 324/338 |
| 5,157,331 | 10/1992 | Smith | 324/369 |
| 5,280,243 | 1/1994 | Miller | 324/303 |
| 5,563,512 | 10/1996 | Mumby | 324/369 |

FOREIGN PATENT DOCUMENTS

| 0581666 | 2/1994 | European Pat. Off. | 324/303 |
|---|---|---|---|

*Primary Examiner*—Louis M. Arana
*Attorney, Agent, or Firm*—Brigitte L. Jeffery; David Garrod; Keith G. W. Smith

[57] ABSTRACT

The instruments of a pulsed nuclear magnetic resonance device are included in a drill collar for evaluating earth formations. The resulting tool makes NMR measurements through an electrically non-conductive shield while the formation is being drilled.

27 Claims, 3 Drawing Sheets

APPARATUS FOR PROTECTING A MAGNETIC RESONANCE ANTENNA

CROSS-REFERENCES

This present application is related to co-pending application Ser. No. 08/430,697, filed Apr. 28, 1995, which is a continuation of application Ser. No. 08/200,815, filed Feb. 22, 1994, abandoned, which is a continuation of parent application Ser. No. 07/922,254, filed Jul. 30, 1992. This application is also related to co-pending application Ser. No. 08/337,784, filed Nov. 14, 1994, which is a continuation-in-part of application Ser. No. 08/200,815, filed Feb. 22, 1994, abandoned, which is a continuation of parent application Ser. No. 07/922,254, filed Jul. 30, 1992. This application is also related to co-pending application Ser. No. 08/338,317, filed Nov. 14, 1994, which is a continuation-in-part of application Ser. No. 08/200,815, filed Feb. 22, 1994, abandoned, which is a continuation of parent application Ser. No. 07/922,254, filed Jul. 30, 1992. All of these applications are incorporated herein by this reference.

BACKGROUND OF THE INVENTION

The present invention relates to an apparatus for protecting a sensor. In particular, the invention provides an apparatus for protecting a magnetic resonance antenna used for measuring the parameters of an earth formation while drilling a borehole into the formation.

The measurement of desired earth parameters during the actual drilling process is known in the art as measuring while drilling or logging while drilling. Sensors located inside or outside of a drill collar perform measurements on the rock and its fluid content. The measurements are either stored downhole for later retrieval or transmitted to the surface in real-time. The drill collar is a metallic structure that conveys the torque required for the drilling operation. Also, the drill collar is a conduit for the drilling mud that is used to lubricate the drill bit and carry the cuttings to the surface. Since audio and radio frequency electromagnetic fields do not penetrate the metallic body of the drill collar, sensors of electromagnetic fields must be mounted outside the metallic body of the drill collar. These sensors are subject to abrasions resulting from particles in the drilling mud and the impact of the sensor against the earth formation. Often, wear bands are employed on the drill collar to provide an adequate amount of standoff between the sensors and the formation thereby reducing or eliminating the impact of the sensor against the earth formation.

U.S. patent application Ser. No. 08/430,697 describes a slotted metallic shield covering a logging while drilling nuclear magnetic resonance tool. However, a slotted metallic shield significantly degrades the sensitivity of a radio frequency electromagnetic sensor. The loss of sensitivity is detrimental in magnetic resonance measurements, which require the detection of weak signals.

SUMMARY OF THE INVENTION

The disadvantages of the prior art are overcome by means of the subject invention which comprises a method and apparatus for protecting a sensor from abrasion and impact against earth formation cuttings while drilling a borehole. The apparatus comprises a drill collar having an exterior surface and a recess in the exterior surface. A sensor assembly is fixedly attached to the recess. A layer of non-conductive material envelopes the sensor assembly. An electrically non-conductive shield is superposed upon the sensor assembly thereby protecting the sensor from impact and abrasions without compromising sensor performance. The shield is composed of an impact, wear resistant material which may be reinforced by a plurality of embedded fibers. Alternatively, the shield is composed of a plurality of pliable fibers having a high tensile strength. Means are provided to secure the shield to the drill collar.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

In the drawings.

DETAILED DESCRIPTION OF THE PREFERRED EMBODIMENT

Figure 1:
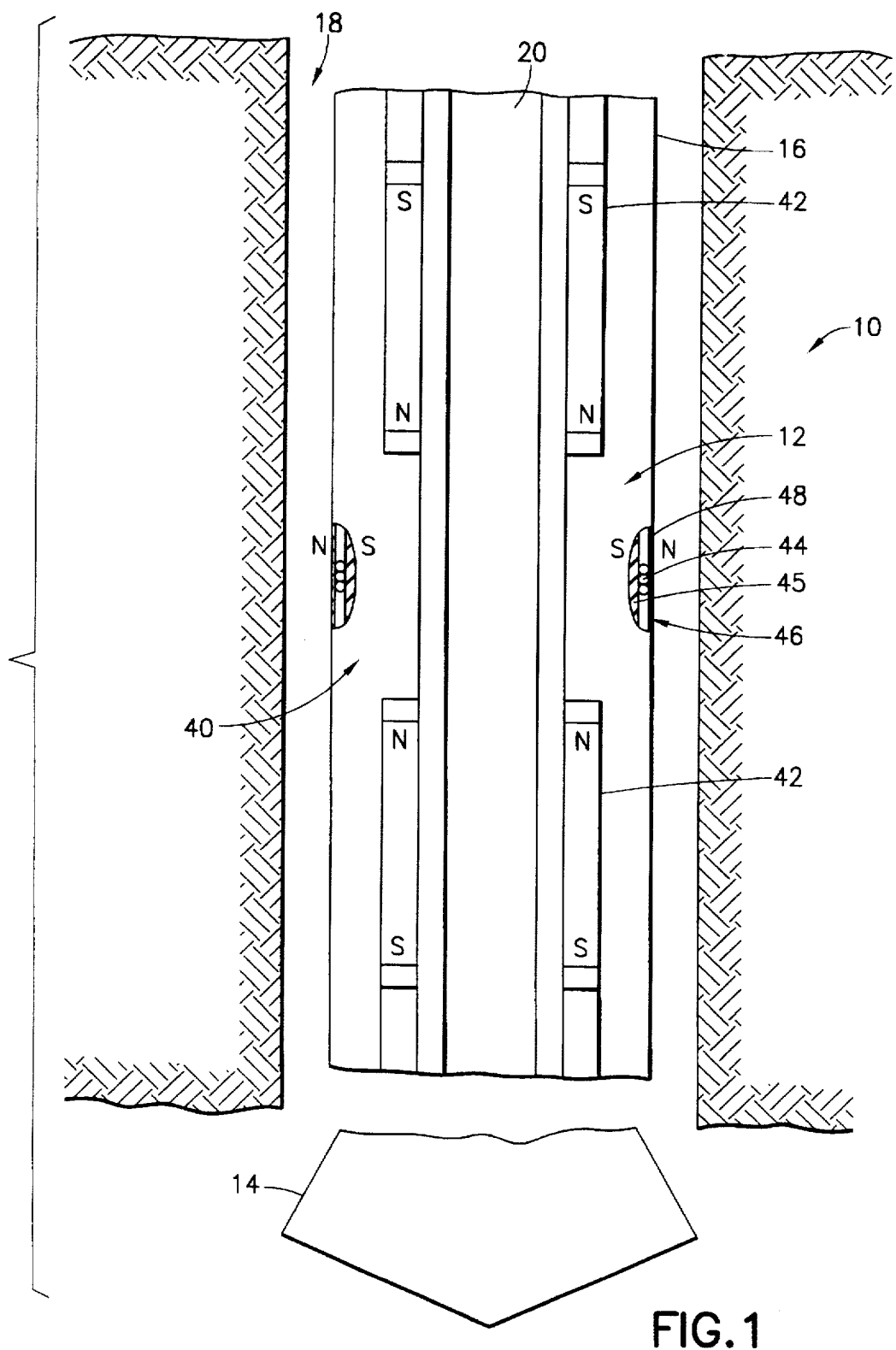
FIG. 1 is a side elevational view depicting a cross section of a logging while drilling tool for pulsed NMR formation evaluation.

FIG. 1 illustrates a measuring while drilling tool 10 which includes a drill bit 14, drill string 16, and a pulsed NMR device 40 housed within a drill collar 12. The drill bit 14 and drill string 16 comprise means for drilling a borehole 18 in an earth formation. As is known in the art, a drive mechanism (not shown) rotates the drill string 16 and drill bit 14. Alternatively, a positive displacement motor may be used to rotate the drill bit 14 without the necessity of rotating the drill string 16. The borehole 18 typically contains fluids, such as drilling mud, which are pumped into the borehole 18 from the surface to carry away formation cuttings back to the surface.

Still referring to FIG. 1, the pulsed NMR device 40 comprises RF antenna 44 mounted in a recessed area 46 of the drill collar 12 and two tubular magnets 42 which are positioned in opposing directions. The antenna 44 preferably comprises a coil which surrounds channel 20. Further, the recess 46 is filled with a nonconducting material 45 such as plastic or rubber. Alternatively, the antenna recess 46 may be filled with ferrite to improve the efficiency of the RF antenna 44. The RF antenna 44 can be protected by a metallic shield 48 with axial slots to let out the RF magnetic field. The metallic shield 48 is mounted in the recess 46 and radially outside the antenna 44. The construction of antenna 44 and metallic shield 48 is described in co-pending U.S. patent application Ser. No. 08/430,697. The metallic shield 48 significantly degrades the sensitivity of RF antenna 44. The loss of sensitivity is detrimental in magnetic resonance measurements, which require the detection of weak signals.

Figure 2:
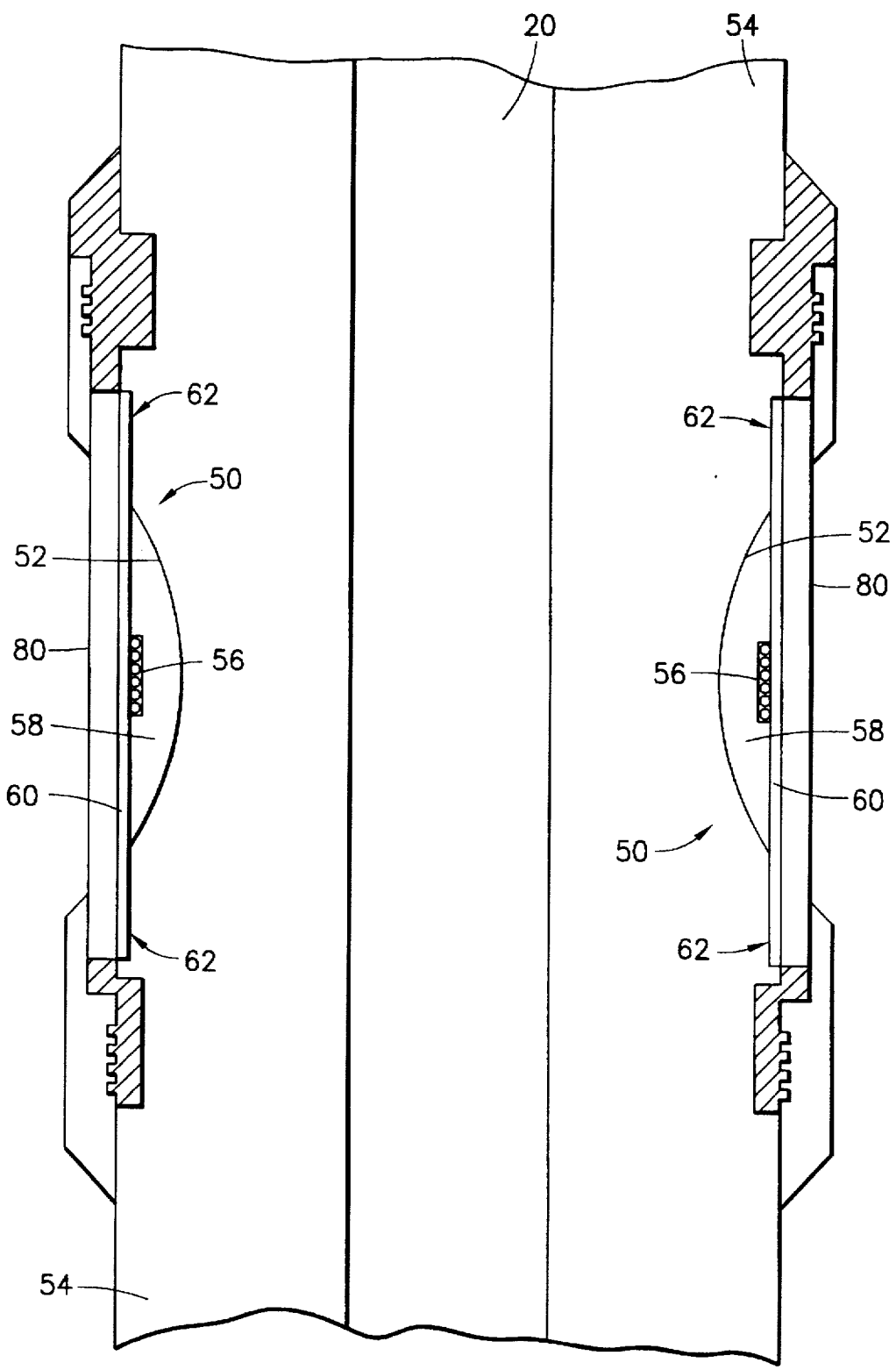
FIG. 2 is a side elevational view of the tool with a sensor assembly and shield in accordance with the subject invention; and, FIG. 3 is a side elevational view of the tool with a sleeve shielding the sensor assembly.

FIG. 2 illustrates the subject invention. A sensor assembly 50 is fixedly attached to a first recessed area 52 of the drill collar 54 and the outer surface of the drill collar 54 using a bonding material such as glue, epoxy, or a similar adhesive. Preferably, the recessed area 52 is copper and/or gold coated to increase its electrical conductivity. The coating reduces the amount of thermal noise generated by the drill collar 54 and detected by the antenna 56. The sensor assembly 50 comprises an RF antenna 56 and ferrite material 58 to improve the efficiency of antenna 56. The sensor assembly 50 further comprises a layer 60 of a non-conductive material, such as plastic or rubber, molded around the antenna 56 and ferrite 58 so as to form a liquid impervious seal thereby preventing borehole fluids from leaking into the sensor assembly 50. The layer 60 has a flange 62 which extends beyond the ferrite material 58 in order to form a seal with the drill collar 54.

The sensor assembly 50 is protected against abrasions from particles in the drilling mud and impact against the earth formation by an electrically non-conductive shield 80. In a preferred embodiment of the invention, shield 80 is composed of an impact, wear resistant material, including, but not limited to, a ceramic material such as transition toughened zirconia. The ceramic material may be segmented to decrease the likelihood of breakage during the drilling process. The subject invention does not contemplate a shield 80 composed entirely of fiberglass, a relatively soft material susceptible to erosion in the drilling environment.

To increase its lifetime and effectiveness, the shield 80 is alternately composed of a wear resistant material, such as ceramic, reinforced by embedded fibers. The fibers may have a random orientation within the wear resistant material or the fibers may form one or more layers of woven mesh. Preferably, the fibers consist of a high tensile strength, flexible material, such as asbestos or metal, that can withstand the firing temperature of the wear resistant material. Metallic fibers shall have a non-conductive coating, or alternatively, metallic fibers shall be oriented to prevent electrical conduction between the fibers.

In an alternate embodiment of the invention, shield 80 is composed of pliable fibers having a high tensile strength and wear resistant particles. The fibers and particles are bound together using epoxy, PEEK, or a similar bonding material. The fibers may include, but are not limited to, glass fibers, carbon fibers, or polymer fibers such as Kevlar. The wear resistant particles are preferably made of zirconia, alumina, silicon nitride, diamond or sapphire powder.

Figure 3:
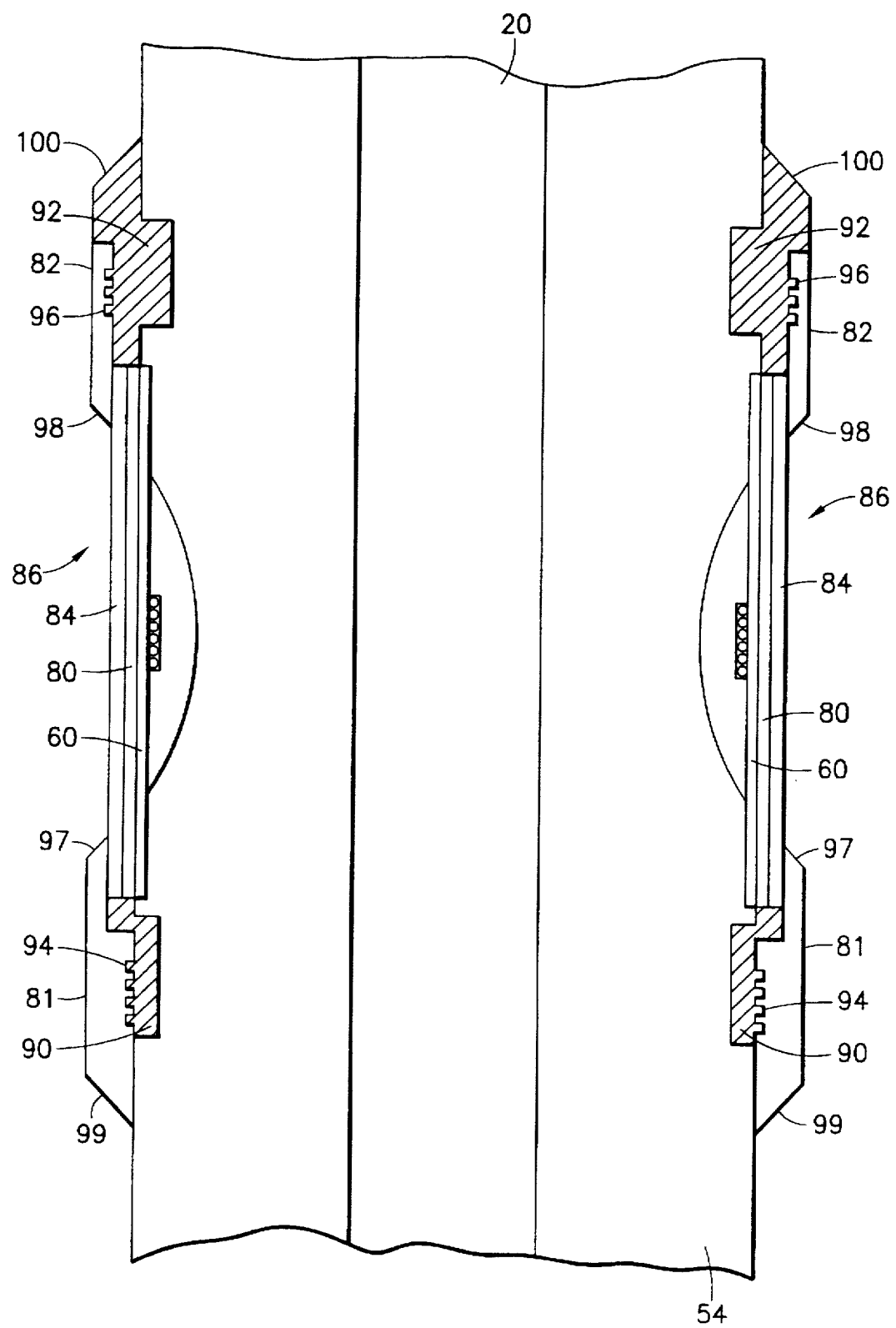

Referring to FIG. 3, cover 84 is comprised of a composite material well suited for borehole temperatures and pressures, such as Randolite (a mark of the Randolph Corporation). If the shield 80 fractures, the cover 84 will retain any shield 80 fragments and acts as a secondary means for protecting the sensor assembly 50 against abrasions from particles in the drilling mud and impact against the earth formation. Fragments from a fractured shield 80 may possibly damage the layer 60 of non-conductive material molded around the antenna 56 and ferrite 58. Therefore, it is within contemplation of the subject invention to coat the surface of shield 80 in contact with layer 60 with a composite material such as the material used for cover 84. In a preferred embodiment, sleeve 86 is comprised of cover 84 wrapped and bonded onto shield 80. The sleeve 86 is removably mounted onto the sensor assembly 50 and retained by bands 81, 82. Alternatively, the cover 84 is removably mounted onto shield 80.

Referring to FIG. 2 and FIG. 3, the drill collar 54 has a second recessed area 90, 92. A threaded member 94, 96 is fixedly mounted inside the recessed area 90, 92. The outermost surface, i.e., sleeve 86, cover 84, or shield 80, is secured to the drill collar 54 by bands 81, 82 which are screwedly mounted onto the threaded members 94, 96. The bands 81, 82 are coated with an abrasion resistant material such as tungsten carbide. A first end 97, 98 of the bands 81, 82 is secured onto the outermost surface without obstructing antenna 56. The ends 97, 98, 99, 100 of the bands 81, 82 are secured so as to prevent movement in the axial direction of bands 81, 82 during the drilling process.

The foregoing description of the preferred and alternate embodiments of the present invention have been presented for purposes of illustration and description. It is not intended to be exhaustive or limit the invention to the precise form disclosed. Obviously, many modification and variations will be apparent to those skilled in the art. The embodiments were chosen and described in order to best explain the principles of the invention and its practical application thereby enabling others skilled in the art to understand the invention for various embodiments and with various modifications as are suited to the particular use contemplated. It is intended that the scope of the invention be defined by the accompanying claims and their equivalents.

What I claim is:

1. An apparatus for protecting a sensor from impact and abrasion while drilling a borehole, comprising:

a drill collar having an exterior surface;

a recess in the exterior surface;

a sensor assembly fixedly attached to the recess;

an electrically non-conductive shield superposed upon the sensor assembly; and, means for securing the shield to the sensor assembly and the drill collar.

2. An apparatus as set forth in claim 1, wherein the recess has a highly conductive metal coating and the sensor assembly comprises:

an antenna; and, a layer of an electrically non-conductive material molded around the antenna and conducting material so as to form a fluid impervious seal.

3. An apparatus as set forth in claims 1 or 2, wherein the shield is composed of an impact, wear resistant material.

4. An apparatus as set forth in claim 3, wherein the impact, wear resistant material is ceramic.

5. An apparatus as set forth in claim 4, wherein the impact, wear resistant material is segmented.

6. An apparatus as set forth in claim 3, wherein the impact, wear resistant material is reinforced by a plurality of embedded fibers.

7. An apparatus as set forth in claim 6, wherein the plurality of embedded fibers have a random orientation within the wear resistant material.

8. An apparatus as set forth in claim 6, wherein the plurality of embedded fibers form at least one layer of woven mesh.

9. An apparatus as set forth in claim 6, wherein the plurality of embedded fibers have a non-conductive coating.

10. An apparatus as set forth in claims 1 or 2, wherein the shield is composed of a plurality of pliable fibers having a high tensile strength and a plurality of wear resistant particles bound together by a bonding material.

11. An apparatus for protecting a sensor from impact and abrasion while drilling a borehole, comprising:

a drill collar having an exterior surface;

a recess in the exterior surface;

a sensor assembly fixedly attached to the recess;

an electrically non-conductive shield superposed upon the sensor assembly;

a cover removably mounted onto the shield; and, means for securing the cover and the shield to the drill collar.

12. An apparatus as set forth in claim 11, wherein the recess has a highly conductive metal coating and the sensor assembly comprises:

an antenna; and, a layer of an electrically non-conductive material molded around the antenna and conducting material so as to form a fluid impervious seal.

13. An apparatus as set forth in claims 11 or 12, wherein the cover is comprised of a composite material well suited for borehole temperatures.

14. An apparatus as set forth in claim 13, wherein the cover further comprises a plurality of wear resistant particles embedded within the composite material.

15. An apparatus for protecting a sensor from impact and abrasion while drilling a borehole, comprising:

a drill collar having an exterior surface;

a recess in the exterior surface;

a sensor assembly fixedly attached to the recess;

a sleeve removably mounted onto the sensor assembly; and, means for securing the sleeve to the sensor assembly and the drill collar.

16. An apparatus as set forth in claim 15, wherein the recess has a highly conductive metal coating and the sensor assembly comprises:

an antenna; and, a layer of an electrically non-conductive material molded around the antenna and conducting material so as to form a fluid impervious seal.

17. An apparatus as set forth in claims 15 or 16, wherein the sleeve comprises a first and second means for protecting the sensor assembly from impact and abrasion, the second protection means is fixedly mounted onto the first protection means.

18. An apparatus as set forth in claim 17, wherein the first protection means comprises an electrically non-conductive shield.

19. An apparatus as set forth in claim 18, wherein the second protection means is comprised of a composite material well suited for borehole temperatures.

20. An apparatus as set forth in claim 19, wherein the shield is composed of an impact, wear resistant material.

21. An apparatus as set forth in claim 20, wherein the impact, wear resistant material is ceramic.

22. An apparatus as set forth in claim 21, wherein the impact, wear resistant material is segmented.

23. An apparatus as set forth in claim 20, wherein the impact, wear resistant material is reinforced by a plurality of embedded fibers.

24. An apparatus as set forth in claim 23, wherein the plurality of embedded fibers have a random orientation within the wear resistant material.

25. An apparatus as set forth in claim 23, wherein the plurality of embedded fibers form at least one layer of woven mesh.

26. An apparatus as set forth in claim 23, wherein the plurality of embedded fibers have a non-conductive coating.

27. An apparatus as set forth in claim 19, wherein a surface of the shield is coated with the composite material.

* * * * *